Jan. 24, 1967 E. C. DOWLING 3,300,775

SEQUENTIAL BIT BINARY DETECTOR CIRCUIT AND SYSTEM

Filed Nov. 6, 1963 5 Sheets-Sheet 1

STEPS

| | | | | | | | | | |
|---|---|---|---|---|---|---|---|---|---|
| 1 | | 1 | 0 | 0 | 0 | 0 | 1 | 0 | 0 |
| 2 | | 0 | 1 | 0 | 0 | 0 | 0 | 1 | 0 |
| 3 | | 0 | 0 | 1 | 0 | 0 | 0 | 0 | 1 |
| 4 | | 1 | 0 | 0 | 1 —I→ | 1 | 0 | 0 | 0 |
| 5 | | 1 | 1 | 0 | 0 | 0 | 1 | 0 | 0 |
| 6 | | 0 | 1 | 1 | 0 | 0 | 0 | 1—(A) | 0 |
| 7 | | 1 | 0 | 1 | 1 —I→ | 1—(A) | 0 | 0 | 0 |
| 8 | | 0 | 1 | 0 | 1 —I→ | 1 | 0 | 0 | 0 |
| 9 | | 1 | 0 | 1 | 0 | 0 | 1—(A) | 0 | 0 |
| 10 | | 1 | 1 | 0 | 1 —I→ | 1 | 0 | 0 | 0 |
| 11 | | 1 | 1 | 1 | 0 | 0 | 1—(A) | 0 | 0 |
| 12 | | 1 | 1 | 1 | 1 —I→ | 1—(A) | 0 | 0 | 0 |
| 13 | | 0 | 1 | 1 | 1 —I→ | 1—(A) | 0 | 0 | 0 |
| 14 | | 0 | 0 | 1 | 1 —I→ | 1—(A) | 0 | 0 | 0 |
| 15 | | 0 | 0 | 0 | 1 —I→ | 1 | 0 | 0 | 0 |
| 16 | | 1 | 0 | 0 | 0 | 0 | 1 | 0 | 0 |
| 17 | | 0 | 1 | 0 | 0 | 0 | 0 | 1 | 0 |
| 18 | | 0 | 0 | 1 | 0 | 0 | 0 | 0 | 1 |
| 19 | | 1 | 0 | 0 | 1 —I→ | 1 | 0 | 0 | 0 |
| 20 | | 1 | 1 | 0 | 0 | 0 | 1 | 0 | 0 |

CYCLE (steps 1–15)

DETECT (step 3) — CYCLE — DETECT (step 18)

INVENTOR.
EDWARD C. DOWLING
BY
Curtis, Morris & Safford

INVENTOR
EDWARD C. DOWLING
BY
Curtis, Morris & Safford

INVENTOR.
EDWARD C. DOWLING
BY
Curtis, Morris & Safford

INVENTOR.
EDWARD C. DOWLING
BY
Curtis, Morris & Safford

INVENTOR.
EDWARD C. DOWLING
BY
Curtis, Morris & Safford

United States Patent Office 3,300,775
Patented Jan. 24, 1967

3,300,775

SEQUENTIAL BIT BINARY DETECTOR CIRCUIT AND SYSTEM

Edward C. Dowling, Harrisburg, Pa., assignor to AMP Incorporated, Harrisburg, Pa.
Filed Nov. 6, 1963, Ser. No. 321,941
9 Claims. (Cl. 340—348)

This invention relates to electrical/electronic circuits and systems for producing one or more output signals exactly related in time and number to a given input signal of a train of input signals for use in a wide variety of communication and control applications, including timing, arithmetic, counting, error correction, decoding and the like.

One object of the invention is to provide a novel circuit for automatically producing an output signal at a selected time or count based upon a source of input signals which are, aside from number, non-intelligence bearing.

Another object of the invention is to provide a circuit and system for producing a sequence of output pulses each spaced in time and count with respect to distinct pulses in distinct cycles of pulse patterns developed from non-intelligence bearing input pulse clock.

Yet another object of the invention is to provide a novel means for producing repetitive cycles of distinct binary codes in combination with a novel detector capable of producing an output pulse associated with a distinct code within said cycle of codes.

A still further object of the invention is to provide a maximal feedback shift register capable of generating repetitive cycles in distinct binary codes in conjunction with a detector for detecting one of said distinct codes in a cycle and a sequencer for changing the number of steps followed by the maximal feedback shift register within a cycle to produce differently timed output pulses.

Yet another object of the invention is to provide a novel circuit for translating a numerical representation of time or count directly into binary intelligence form.

A general object of the invention is to provide an improved timing system having relatively simple drive requirements.

Other objects and attainments of the present invention will become apparent to those skilled in the art upon a reading of the following detailed description when taken in conjunctiton with the drawings in which there are shown and described illustrative embodiments of the invention; it is to be understood, however, that these embodiments are not intended to be exhaustive nor limiting of the invention, but are given for purposes of illustration in order that others skilled in the art may fully understand the invention and the principles thereof and the manner of applying it in practical use so that they may modify it in various forms, each as may be best suited to the conditions of a particular use.

The invention contemplates the provision of a circuit and system adapted to be driven by non-intelligence bearing signals such as that of a standard clock source to produce a distinct output pulse which is related to a time base or count. The technique employed features the use of a maximal feedback shift register driven by a clock to develop distinct binary bit patterns in a repetitive cycle of steps in conjunction with a novel detector circuit operable to produce an output pulse related in time to one step of the maximal feedback shift register cycle. As will be appreciated by those skilled in the art, the maximal feedback register is by definition, capable of producing $2^n-1$ distinct code patterns where $n$ represents the number of stages or intelligence bit positions in the register. The detector of the invention uses $n$ stages arranged to be driven by the code patterns generated so as to produce a detect output controlled by the occurrence of a unique code pattern of $n$ bits produced from the maximal feedback shift register cycle.

In an expanded embodiment of the invention utilizing the maximal feedback shift register and detector, a further technique is employed to regulate the output of the detector to a fraction of the total register cycle by introducing into the register any one of the code patterns traversed in its cycle to thus control or regulate the time or count of an output pulse to a fractiton of the steps of such cycle. Several versions of pattern generating means are contemplated which may be manually, semi-automatically or automatically set into the maximal feedback shift register. In one version a further embodiment of the invention includes a novel circuit employing a co-ordinate matrix permitting the exact time of detect output in seconds, minutes or some other measure, to be preset expressed numerically with connections inherently provided, expressed in binary form, associated with the exact pattern or code representing a step in the cycle of maximal feedback shift register to thus leave a remainder of steps identical to the numerical value preselected.

From the above it should be appreciated that the invention has a wide utility in communication and control applications for timing and counting. Because of the use of binary form in the maximal feedback shift register, the invention has other uses in error detection systems, coding, decoding and the like, wherein the particular function sought to be achieved may be directly accomplished by changing or inserting the binary code pattern and thus the output function of the system.

Figure 1:
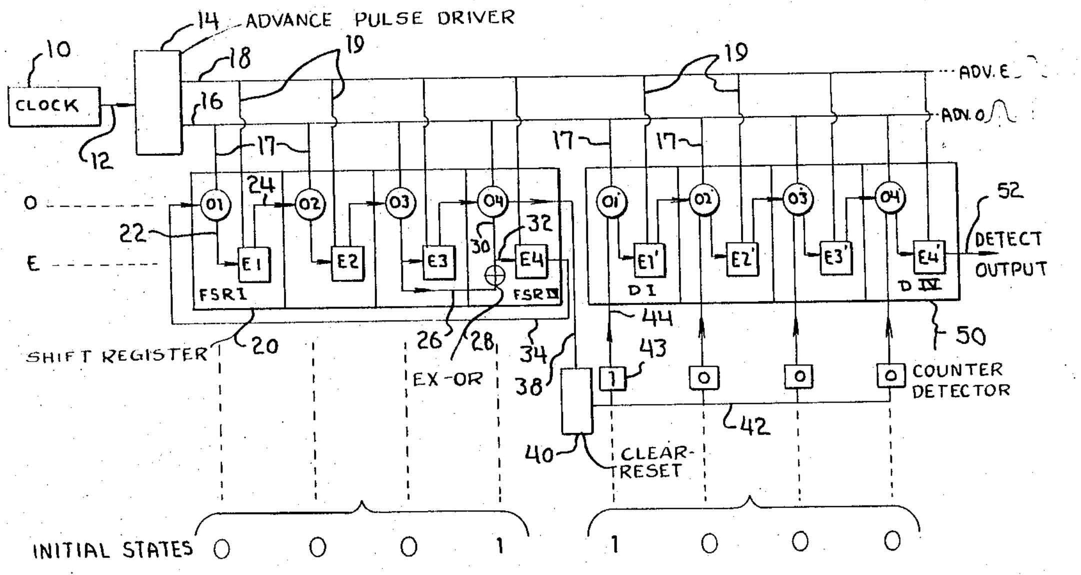
FIGURE 1 is a schematic diagram showing the maximal feedback shift register and novel detector of the invention in conjunction with an exemplary representation of the binary states existent in the register and in the detector at each step of the system cycle to explain the system operation.
Figure 4:
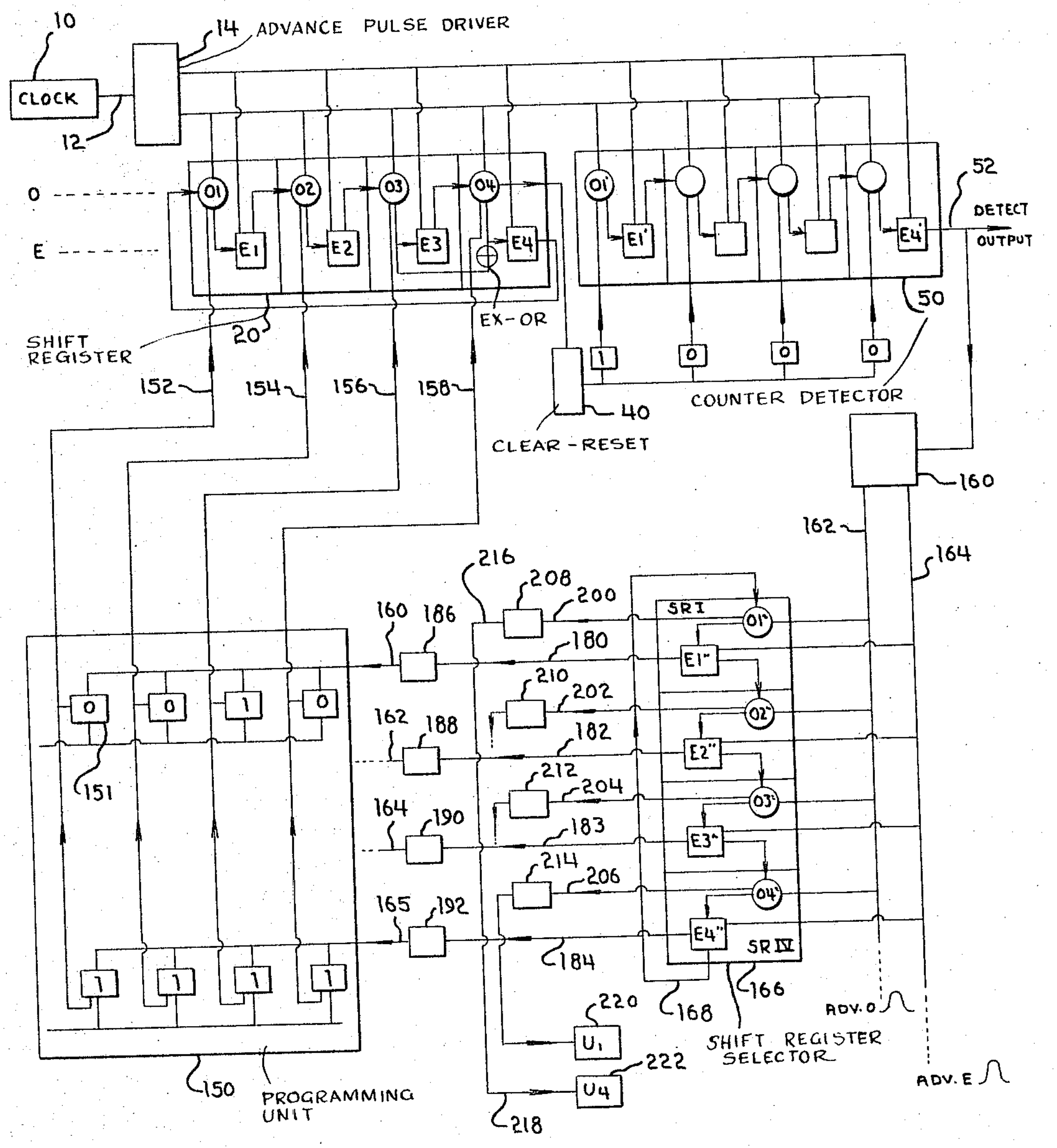
FIGURE 4 is a schematic diagram of the circuit as shown in FIGURE 1, in combination with a sequencing unit adapted to provide an automatic and sequenced setting of the register to produce differently timed output signals in each of four exemplary cycles.
Figure 5:
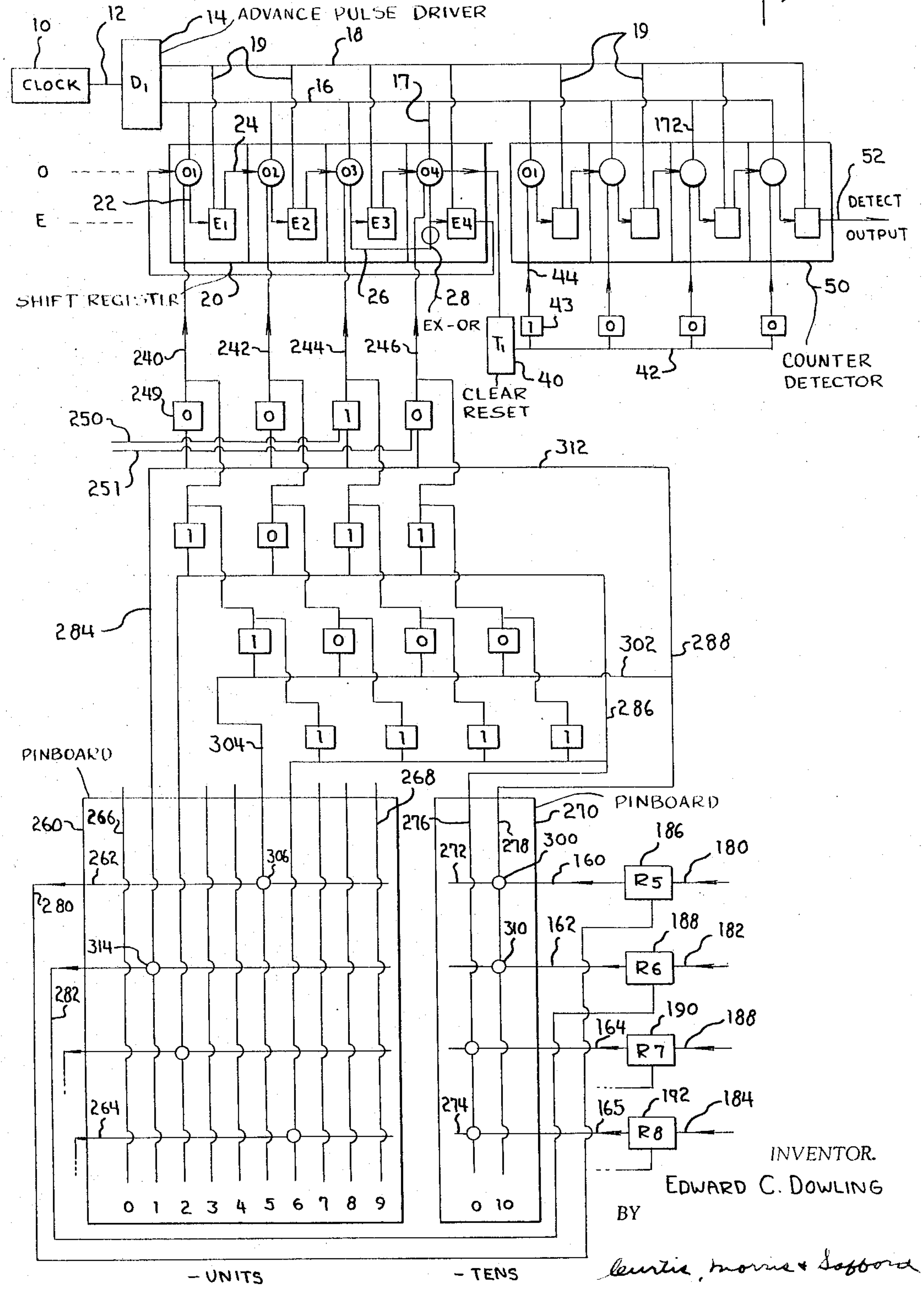
Figure 6:
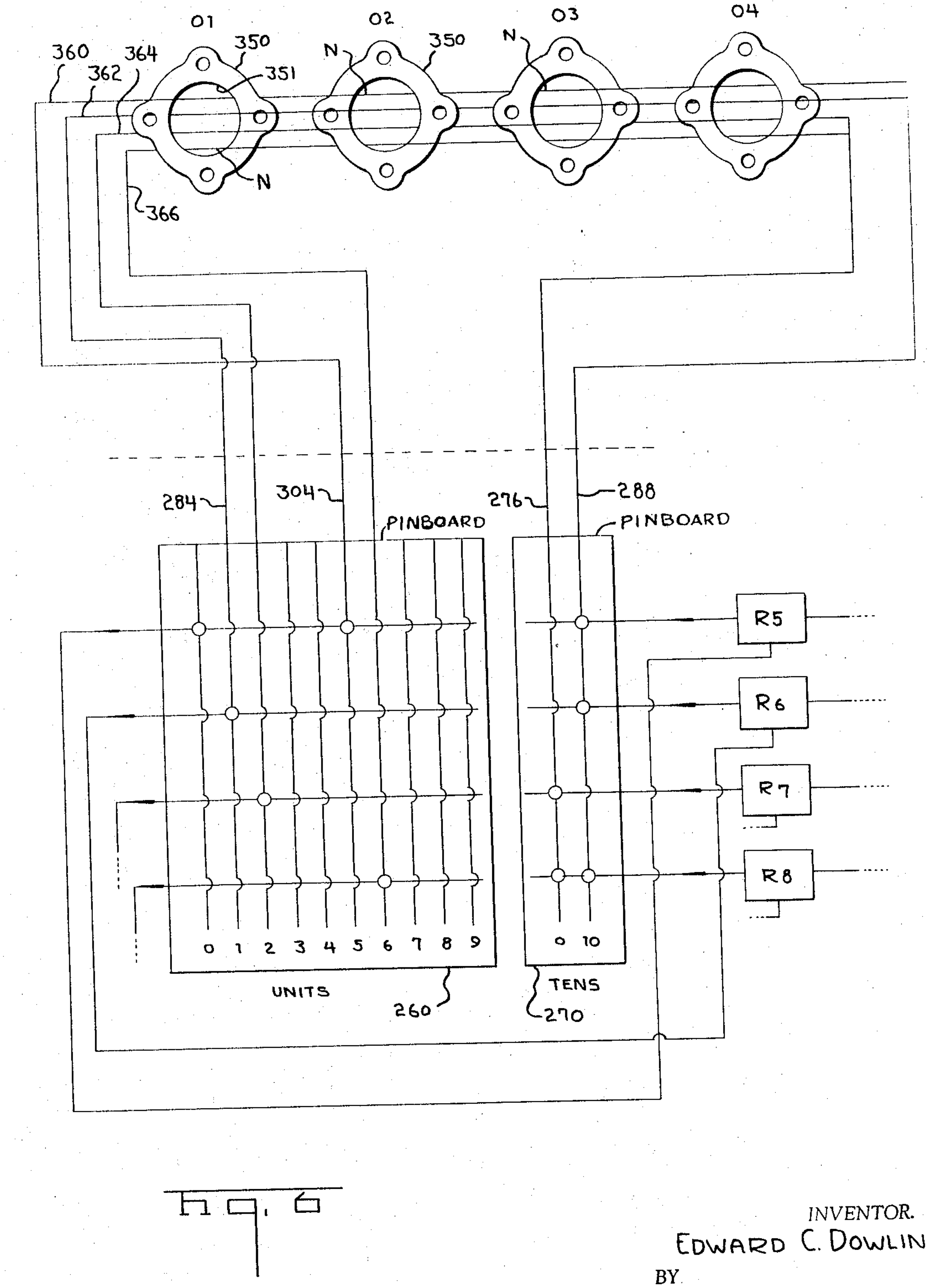

FIGURE 5 is a schematic diagram of the circuit of FIGURE 1, in combination with the sequencing device shown in FIGURE 4 and an alternative embodiment including a co-ordinate matrix carrying conductive paths which may be manually selected in terms of time or count to reprogram the maximal feedback shift register to produce differently timed output signals for each of four repetitive cycles; and FIGURE 6 is a schematic diagram of the matrix portion of FIGURE 5, including an exemplary showing of core pattern wiring.

Turning now to FIGURE 1, there is shown the basic part of the circuit and system of the invention including a source of pulses or clock 10, an advance pulse developing driver 14, a maximal feedback shift register 20, a clear-reset driver 40, and a detector-counter 50. The clock 10 may be considered to be any standard source of pulses, D.C. or A.C., continuous or spaced groups or trains. As will become apparent, the operation of the circuits of the invention is so arranged as to be solely dependent upon the clock 10 with respect to any criticality of synchronism and except for manual program changing, each sequence of operation of the system will follow exactly the occurrence of clock pulses without regard to spacing or substantial change in frequency. The system of the invention, although not progressively ordered, is basically a binary coded system and advantageously utilizes binary intelligence transfer techniques, thus making the system, within reasonable limits, independent of clock pulse characteristics other than pulse existence or non-existence. Clock 10 may be considered as sufficiently non-critical as to constitute supplies as different as a self-contained battery operated source of pulses producing D.C. pulses at ten cycles per second or, simply line voltage at sixty cycles per second.

The advance driver 14 must, of course, be compatible with the characteristics of the clock source 10, with respect to voltage and current levels, which compatibility may be most reasonably accomplished through an appropriate transformer or isolating circuit (not shown) within 14 driven via lead 12 from 10. Since the function of the control pulses produced by 10 is essentially that of a trigger rather than a power supply, it is only necessary to provide a type of advance driver having a suitable threshold to respond to a voltage spike as representative of the clock pulse.

The function of the advance pulse driver 14 is to provide to advance driver leads 16 and 18, distinct and phased advance pulses having characteristics and spacing compatible with the particular type of sub-components employed in the feedback register 20 and detector 50. In operation, driver 14 responds to one or two clock input pulses to produce a first advance pulse on lead 16, and after a delay an advance pulse on lead 18, the advance pulses being identified conventionally in the standard "odd" and "even" representation of ADV. O, ADV. E. As an example of one arrangement, the advance driver 14 may be in the form of the driver of U.S. patent application Serial No. 114,695, filed June 5, 1961, in the name of L. G. Wiley, with the lead 12 representing the input trigger and the leads 16 and 18 representing the ADV. O and ADV. E output paths from each half of the unit. In this case the first clock or trigger pulse applied on lead 12 will result in a pulse produced on one of the drive leads 16 or 18, and the second trigger applied on 12 will result in a pulse being produced on the other lead, the pulse phasing or spacing being dependent upon the spacing between trigger pulses. This arrangement will result in the driver 14 operating as a two-to-one scaler producing one advance cycle per two clock or trigger pulses. As will be more apparent hereinafter, certain applications have an intrinsic requirement with respect to speed of operation, which is better met by dividing the nominal clock frequency in half. For example, in traffic signaling applications wherein the circuit of the invention, as shown in FIGURE 1, is utilized to directly drive a signal sequencing device, the nominal timing between signal changes is from fifteen to thirty seconds, a time period more efficiently handled in terms of number of stages required for the units 20 and 50, by a thirty cycles-per-second advance from a line clock of sixty cycles per second, rather than directly at sixty advance cycles-per-second. By using a scaler inserted in lead 12, further reductions in the clock to system advance ratio may be obtained.

As indicated in FIGURE 1, the advance driver 14 via leads 16 and 18 operates to supply phase advance pulses in common to the maximal feedback shift register 20, and to detector 50. To facilitate the general description of the invention in its application and use with various types of components, the advance drive leads 16 and 18 are shown connected in parallel to the various stages or bit positions of units 20 and 50, the various O bit positions being commoned by lead junctions such as 17, and the various E bit positions being commoned by leads such as 19. It is, of course, to be understood that the particular interconnection employed for the advance leads depends upon the characteristics of components employed to make up units 20 and 50. Thus, if the units 20 and 50 are formed of magnetic cores the advance leads are in practice serially wound in parallel columns of cores, whereas if units 20 and 50 are comprised of transistor, diode, relay or other devices the parallel type input shown for the advance pulse supply is preferred. Not shown, but understood to be included, each of the advance leads 14 and 16, and the juncture leads 17 and 19, include return paths to the extent necessary.

The units 10, 14 and leads 16, 18, 17 and 19, heretofore described constitute the portion of the circuit shown in FIGURE 1, responsible for advancing and transferring the intelligence stored in each of the stages of the units 20 and 50, and do not constitute part of the intelligence routing, storing or steering portion of the circuit of the invention, and as such should be distinguished with respect to considerations of input or output routing from or between the individual bit positions within the stages of units 20 and 50. Turning now to the general description of units 20 and 50, an equal number of stages are provided for each unit; it being understood that the circuit of FIGURE 1 is purposely limited for the sake of clarity and that many applications will require considerably more stages than the four shown. In this regard it should be kept in mind that the possible number of codes, $2^n-1$, of the maximal feedback shift register 20 increases exponentially as the number of stages $n$ is expanded. Thus, for example, in a device or circuit in accordance with the invention having twenty stages, the possible number of codes and steps is in terms of millions, and in a device in accordance with the invention having one hundred stages, the possible number of codes and steps is in terms of hundred billions. In the exemplary embodiment shown in FIGURE 1, $n$ is four to thus provide fifteen code patterns or steps per cycle of operation of unit 20. The detector 50, as will be made apparent, follows the unit 20 to produce a cycle between detect output pulses of fifteen steps, which is thus the maximal system cycle.

Each stage of unit 20 is symbolically represented and consists of an odd and even bit position denominated O and E, with postscripts identifying the particular stage number. Thus stage FSR I includes the odd and even bit positions O1 and E1. Each of these bit positions may be considered as comprised by standard electrical or electronic components capable of registering binary intelligence. A wide variety of types of one bit stages are commercially available, such as for example, transistorized bits comprised of two interconnected flip-flop circuits, core diode logic modules or all-magnetic core devices of the type shown in U.S. Patent No. 2,995,731 granted August 8, 1961, in the name of J. P. Sweeney. The General Electric SCR Manual, Second Edition, 1961, includes a description on pages 109, 110 of a type of solid state circuit capable of use with the invention with a slight modification to provide a present pattern input to each stage. This type of circuit can be used with a one phase advance cycle.

The basic connection within each stage is as indicated between the O1 and E1 bit positions and FSR I by the intelligence route or lead 22. Between stages the connection is constituted as indicated by the route or lead 24 extending from bit position E1 of FSR I to bit position O2 of FSR II. An additional route or lead is provided from bit position O3, indicated by lead 26 extending into the symbol 28 which represents the logical EXCLUSIVE–OR also supplied by a lead 30 from bit position O4. Intelligence routing extends from 28 to E4 via a lead shown at 32. A feedback loop shown as lead 34 serves to route intelligence signals from E4 to O1.

The symbol 28 may constitute a separate device performing the logical EXCLUSIVE–OR function, or, in the use of magnetic core systems, may be incorporated directly into the coupling winding between magnetic cores in a manner to be hereinafter described. An output lead from 20, shown as 38, is provided to supply the output produced from bit position O4 to the clear-reset driver 40.

As is generally understood, binary intelligence is physically represented, depending upon the type of components being utilized, as the presence or absence of pulses during intelligence transfer and as the presence or absence of voltage/current or a given state or sense of saturation or the position of a relay, with respect to intelligence storage. In such use, opposite physical conditions represent the binary ONE and ZERO. For the purpose of the description herein given, during binary intelligence transfer the binary ONE shall be considered as the presence of a pulse of some level, and the binary ZERO shall be considered as the absence of a pulse. In the actual practice of the circuits of the invention the particular characteristics of the binary ONE and ZERO will, of course, be dependent upon the components employed, i.e., state of saturation for cores and current level for transistors.

The clear-reset driver 40 is supplied as above indicated, by lead 38, which produces binary intelligence from bit position O4. The unit 40 has a threshold responsive to the binary ONE level and nonresponsive to the binary ZERO, the ONE acting then as a trigger for unit 40. Responsive to the input of a binary ONE, 40 provides an output via a single lead such as 42 supplying in parallel each of the stages DI–DIV in detector 50 through a lead such as 44 tied to the O bit positions O1′–O4′. Each individual path such as 44 includes a means such as 43, shown with respect to bit position DI capable of responding to an output pulse from 40 to provide an input to each O bit position of a given binary intelligence content. In vacuum tube or relay type systems, the means 43 may be a standard gate supplied by a source not shown, temporarily driven to conduction by the pulse from 40 to either set or clear the associated O bit position and thus establish a binary pattern or code within the unit 50.

From the foregoing description of the function of 40, 42 and means 43, it should be apparent that the basic use of 40 is as an amplifier to boost the ONE level transmitted from O4 to a value sufficient to properly drive the bit positions of *n* stages into the desired preset pattern. In SCR and transistor systems, the ONE level can be sufficient without amplification so that 40 may be eliminated with hard wired inputs provided to each O bit position, such as to the appropriate base of the ONE or ZERO transistor components. Also, as will be more fully explained hereinafter with respect to the circuit of FIGURE 6 using magnetic cores, the actual units shown as 43 in FIGURE 1 may be dispensed with and replaced by a single lead serially linking each of the cores which form the O bit position in distinct senses to set or clear such cores in the desired pattern.

In a large sense, the detailed description of the operation of the circuit of FIGURE 1 may be more readily appreciated by considering each of the units 20 and 50 to be merely shift registers of the two phase advance type having a number of O and E bit positions intercoupled for serial transfer from left to right, with only the additional features including the EXCLUSIVE–OR 28 and the preset pattern windings leading to the O bit positions. In the operation of the circuit of FIGURE 1, each of the stages FSR I–FSR IV and DI–DIV, respectively, may be considered as containing either a binary ONE or ZERO in storage between advance drive pulses. During advance drive the particular state stored in any given stage is, in a complete advance cycle, transferred from one stage to the next stage in serial fashion. Thus, responsive to a series of clock pulses from unit 10, a series of ADV. O and ADV. E pulses are generated in 14 and applied simultaneously to the various stages of units 20 and 50. The ADV. O pulse is applied first to transfer the intelligence states of the O bit positions to the E bit positions and ADV. E is then applied to achieve a transfer from the E bit positions to the O bit positions, such transfers being along the leads shown, such as 22 and 24, which are representative of the intelligence steering accomplished in the units. As such transfers occur, 28 serves to achieve its logic functions to control the content of ONE–ZERO code patterns generated in 20, and 40 responds to reset 50 to define the detect output cycle as will now be explained.

Immediately beneath the individual units 20 and 50 in FIGURE 1, are columns of binary ONES and ZEROS, which represent the stored intelligence state existent in the O bit positions of each stage, i.e., the O core states following a given ADV. E pulse. Considering now the units 20 and 50 to contain the initial states of binary intelligence indicated in the lower part of FIGURE 1, the application of a single clock pulse will produce from unit 14, one advance cycle comprised of single ADV. O, ADV. E pulses. The application of ADV. O will result in a transfer in unit 20 of the intelligence states stored in the O bit positions to the E bit positions with a similar transfer in unit 50. With respect to unit 20, the EXCLUSIVE–OR 28 operates to provide ONE inputs to bit position E4 responsive to outputs from bit position O3 and O4 of ONE and ZERO or ZERO and ONE, respectively, and to provide a ZERO input to E4 responsive to outputs from O3 and O4 of ONE and ONE or ZERO and ZERO, respectively. From the initial states shown then, the ADV. O advance phase will produce a ZERO input from O3 and a ONE input from O4 to E4 to result in E4 being driven to the ONE state. The ADV. E half of the advance cycle will next result in the ONE in E4 being transferred to O1 via feedback loop lead 34. The remaining bit positions of both 20 and 50 will experience standard transfers to receive and retain the intelligence bit or state of the preceding stage following ADV. O and ADV. E. This is indicated by the pattern shown with respect to the first step, or step 1 shown in FIGURE 1, wherein the unit 20 contains in its O cores the pattern ONE ZERO ZERO ZERO, and unit 50 contains the pattern ZERO ONE ZERO ZERO.

The next clock pulse will result in a further advance cycle to produce the states shown as step 2 with patterns in 20 and 50, respectively, of ZERO ONE ZERO ZERO and ZERO ZERO ONE ZERO. The EXCLUSIVE–OR 28, responding to inputs of ZERO and ZERO from O3 and O4 produces on the ADV. O cycle, an input of ZERO to E4, which in turn is transferred to O1 and the ADV. 7 stroke. The ONE existent in DII of unit 50 is, of course, transferred to DIII, as shown. The next clock pulse results in the third step of the cycle providing a pattern in unit 20 of ZERO ZERO ONE ZERO and a pattern in unit 50 of ZERO ZERO ZERO ONE. With the arrival of the binary bit ONE in E4′ of unit 50, an output or detect pulse may be considered as produced on lead 52. It is to be realized that E4′ is in the ONE state following ADV. O and the input there accomplished may be taken or read out at ADV. O time or may be taken at ADV. E time as E4′ transmits. This choice offers certain advantages, particularly with respect to magnetic core versions of the system.

The next clock pulse will result in the fourth step of the system cycle with the unit 20 being driven to the pattern ONE ZERO ZERO ONE, the EXCLUSIVE–OR 28 operating on ADV. O to convert the ONE input from O3 and ZERO input from 04 to a ONE input to E4, which ONE is transferred to O ONE on the ADV. E stroke. In effect, the ONE transferred into O4 produces a ONE output or trigger to unit 40, which, as above described, then produces an output on lead 42, clearing out and resetting the ONE ZERO ZERO ZERO pattern in unit 50. This is indicated schematically in FIGURE 1 in the outline of binary patterns by the arrow and symbol T for trigger shown between the patterns for the units 20 and 50. The next clock pulse will result in the pattern shown with respect to step 5, the ONE in stage DI being transferred to DII in unit 50. The next clock pulse will result in the patterns shown with respect to step 6, the ONE in unit 50 being transferred to DIII. In the seventh step as indicated by T, a ONE is transferred from O4 to 40, to thus again clear out and reset unit 50. This operates to effectively annihilate the ONE existent in DIII. Since the ONE in DIII disappears and unit 50 is reset to the ONE ZERO ZERO ZERO pattern, no ONE reaches stage DIV to produce a detect output signal.

The next clock pulse results in the pattern shown in step 8, the ONE output from O4 again serving to trigger 40 and annihilate the ONE then in DI. Considering further clock pulses to be applied, the system shown in FIGURE 1 will continue to operate as above described, with the detector being repetitively cleared and reset in a manner such that no ONE is permitted to reach stage DIV until the eighteenth or maximal register step has been completed. From the patterns associated with unit 20 it will be apparent that the unit begins to repeat in step 16 the cycle traversed from step 1 up through step 15, as expected. On the other hand, the unit 50 traverses a 15 step cycle beginning with step 3 and extending through step 18, such cycle being delineated by the production of detect output pulses at such steps. It is a characteristic of the system of FIGURE 1 that the detector 50, having the same number of stages *n* as the maximal feedback shift register 20, follows exactly in number of steps or time or count, the cycle of unit 20. From this it should be appreciated that exactly timed output pulses may be produced from a relatively non-descript source of clock pulses, completely apart from any outside control pulses or other means. As the clock pulses are applied, the system thus follows to produce an exactly counted or timed output detect signal. Through the use of the system shown in FIGURE 1, detect output pulses may be developed at a fixed number of seconds, hours or years from some initial clock pulse followed by a given number of clock pulses driving the system through its cycles in the manner shown. The system of FIGURE 1, apart from the embodiments to be described hereinafter expanding such system, has as many uses as there are types of clock sources in the communications and control fields. For example, the clock itself may represent a number of types of counting devices adapted to supply an output trigger responsive to each incidence of the event being counted. Applications may be treated ranging from counting parts transferred on a production line to counting vehicular traffic or atomic particles, the resultant number of detect signals from 50 in conjunction with the exact code pattern existent in the feedback shift register 20 exactly identifying the count. In conjunction with this it is contemplated that any suitable readout device compatible with the type of components utilized in unit 20 may be employed to scan the bit content of each stage of the unit.

Figure 2:
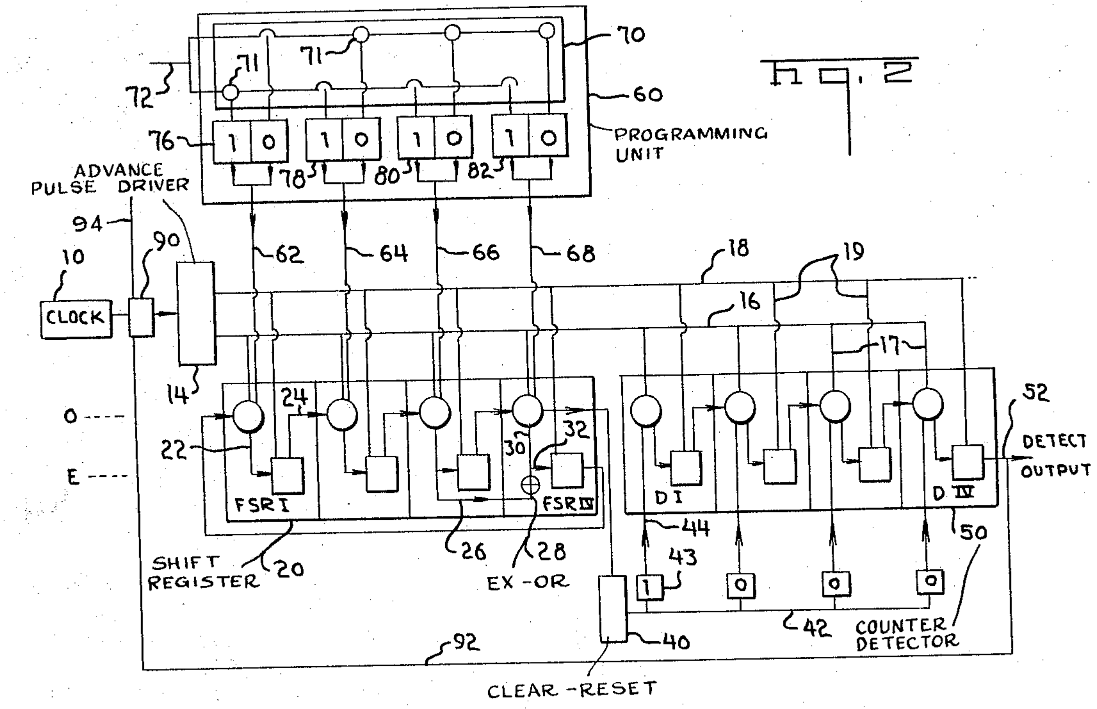
FIGURE 2 is a schematic diagram of the circuit of FIGURE 1 and in addition, a code generating circuit associated with the register to selectively set the initial pattern or code necessary to regulate the time or count of output signal.

The circuit and system described with respect to FIGURE 1 constitutes the heart of a system for which other and highly useful additional circuits have been discovered for extending the scope and utility of the invention. FIGURE 2 shows one such embodiment added to the circuit shown in FIGURE 1, the basic units 10, 14, 20, 40 and 50 being reproduced and identically operable to the same units of FIGURE 1. The addition constitutes a programming unit shown as 60, connected to the unit 20 to preset a pattern of binary bits to the distinct code of any given step of the cycle of 20 shown in FIGURE 1. The unit 60 includes, for the purpose of description, parallel inputs to each of the stages FSR I–FSR IV, via the leads being shown as 62, 64, 66 and 68 individually connected to an O core of a stage. Depending upon the characteristics of the components used to make up the unit 20, the parallel input may be replaced by serial input such as the pattern wiring of magnetic cores shown in FIGURE 6. Unit 60 is comprised of a matrix or path selecting device, shown as 70, which may be considered as a standard pinboard, wherein the insertion of a conductive pin effectively commons a selected path with an energizing signal supplied to horizontal buses. The two buses of 70 are shown as commoned to a lead 72, which represents some source capable of energizing the individual ONE, ZERO sources associated with each stage of unit 20. By inserting a pin at a selected point in the matrix of 70, a particular stage may be set with either a ONE or a ZERO. The individual sources of ONE and ZERO are indicated as 76, 78, 80 and 82, and may be considered as gates powered by means not shown, each capable of producing the binary intelligence shown within the blocks in FIGURE 2. Again, it is to be understood that with certain types of components such as transistors or magnetic cores, the units 76–82 may be dispensed with and hard wired conductive paths linking the bit positions to accomplish either a ONE or ZERO input may be employed. As yet a further alternative the units 76–82 may be eliminated by employing separate ONE and ZERO sources connected to the two horizontal leads of the matrix of 70. Thus, by inserting conductive pins at different points either a ONE or a ZERO source may be tapped with a suitable single gate provided to set the binary intelligence into the O bit positions. The pins 71, shown in FIGURE 2 as inserted in the matrix 70, constitute a pattern of ONE ZERO ZERO ZERO.

With the pins inserted in 70 in the pattern shown, the unit 60 may be initiated upon command by an energization via lead 72 of each of the units 76–82, to produce inputs to 20 via leads 62–82, setting the unit to the step 1 shown in FIGURE 1. It is, of course, contemplated that the programming of unit 20 is to be accomplished while the system is at rest. For this reason a gate or switch 90 may be included in the lead 12, which is closed following the programming operation of unit 60. It should be apparent that by placing pins in some other pattern, any one of the steps for the system shown in FIGURE 1 may be set into unit 20 to thus control the time or count of the detect output from unit 50. To achieve an automatic shut-off of the system responsive to detect output, an output lead 92 taken from the detect output of unit 50 may be utilized to operate the gate 90 to open the conductive path 12 following each detect output signal. A control lead 94 to gate 90 may be then energized by any suitable means to close the conductive path through gate 90 for a second cycle. Between cycles or between operations of gate 90, the unit 60 may be manually reprogrammed if desired to a different one of the steps to provide a differently timed or counted detect output signal.

In conjunction with this, by compiling a table listing each of the distinct code patterns of unit 20 with the number of steps remaining until a detect output signal will occur, the circuit system of FIGURE 2 may be implemented directly to provide timed outputs in terms of time units. For example, the code pattern for step 12 of unit 20, ONE ONE ONE ONE, can be associated with the number 6 to represent the number of steps remaining if unit 20 is started in its cycle at step 12. Thus, if the system is driven to operate at one step per second, by setting the ONE ONE ONE ONE pattern into unit 60 and thereby into unit 20, an output will be produced six seconds after gate 90 has been operated to close path 12 and initiate the system.

Figure 3:
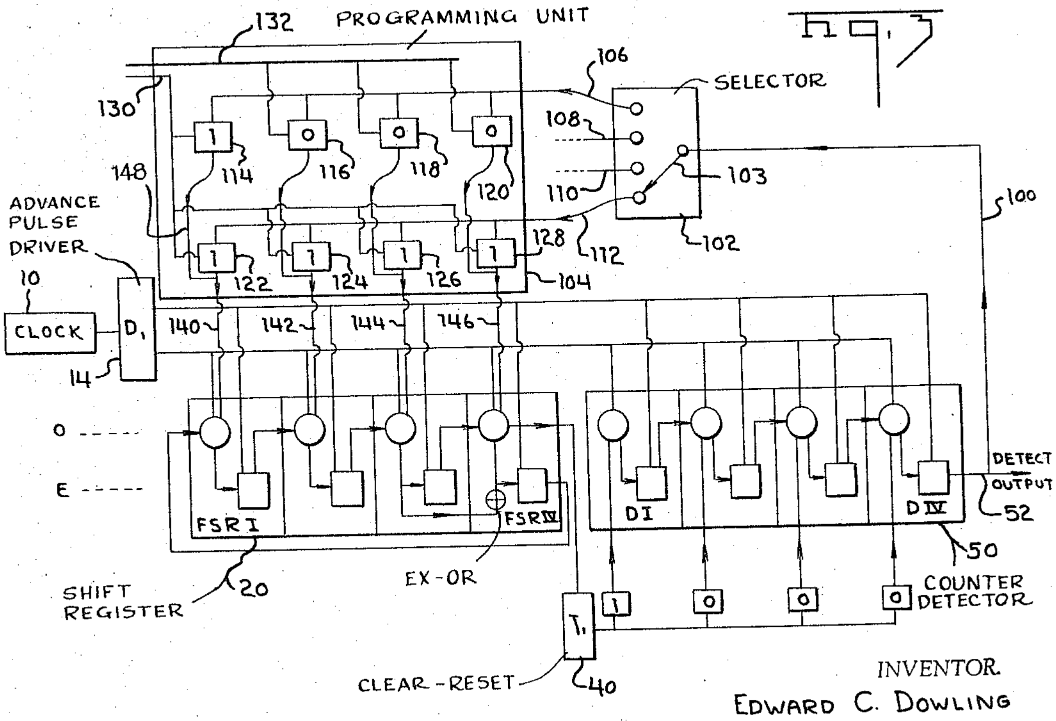
FIGURE 3 is a further embodiment including the circuit of FIGURE 1 in conjunction with an alternative embodiment for generating codes to be set into the maximal feedback shift register to vary the time or count of output signal.

FIGURE 3 represents a further embodiment of the invention and utilizes the circuit and system of FIGURE 1 in conjunction with a self-cycling and semi-automatic programming circuit. In this embodiment a lead 100 is tapped from the detect output lead 52 to supply a selector switch 102, having output taps connected to leads 106, 108, 110 and 112. By appropriate movement of the selector switch arm 103, one of the taps and thereby one of the output leads may be selected and supplied with the detect output signal. Connected to each output lead are a plurality of gates such as gates 114–120 associated with lead 104 and gates 122–128 associated with lead 112 to define distinct program levels within a programmer 104. Each of the gates is in essence, a device which, when triggered by a pulse of the detect output level via a lead such as 106, will provide an output sufficient to set one of the bit positions O1–O4 in unit 20. To this end there is included a binary ONE supply via a lead 130 and a binary ZERO supply via lead 132 with the particular binary gate 114–120, 122–128 operating to sample an appropriate supply via leads taken from 130 to 132. For example, the gates adapted to be triggered from lead 106 are in the pattern ONE ZERO ZERO ZERO, the gate 114 being supplied from 130 and the gates 116, 118 and 120 being supplied from lead 132 as indicated. The gates 122, 124, 126 and 128 are adapted to be triggered by a pulse on lead 112 to develop the pattern ONE ONE ONE ONE, and are thus all connected to lead 130 as shown.

The gates of each programming level in 104 are associated with a given O bit position by input leads to 20 shown as 140, 142, 144 and 146, the gates associated with a given bit position being commoned as indicated by a lead such as 148 associated with lead 140 and gates 114, 122.

In operation the circuit system of FIGURE 3 will automatically recycle from a distinct step in accordance with the setting of switch 102 to select one of the two patterns supplied by the gates associated with the output leads from the switch. Thus, if the switch is set as shown and the clock 10 is considered as free running, the system will provide an abbreviated or fractional cycle beginning with step 12, the ONE ONE ONE ONE pattern to thereby produce a detect output signal once every six steps. By adjusting switch 102 to provide triggers to lead 106, the system may be made to cycle through the full fifteen steps by reason of being initiated from the pattern ONE ZERO ZERO ZERO. As discussed with respect to FIGURE 2, some suitable means is provided to interrupt the clock during the time when the switch 102 is manipulated to change the program of unit 20.

Yet a further embodiment of the invention as shown in FIGURE 4. In this embodiment the feedback shift register unit 20 is connected to be set to a given step via a programming unit 150, substantially identical in function to unit 103 described with respect to the circuit of FIGURE 3. Thus, each of the O bit positions is separately supplied by leads 152, 154, 156 and 158, commoned to gates such as 151 within unit 150 capable of generating distinct bit patterns associated with desired cycle steps. Programming unit 150 is a sequencing circuit which is automatic in its operation to sequentially step from pattern to pattern and thus drive unit 20 to produce differently timed or counted outputs in each of four consecutive repetitive cycles.

In the embodiment of FIGURE 4, unit 50 via lead 52 is connected to trigger an advance driver 160, which may be considered as identical to driver 14 to produce on drive leads 162 and 164, ADV. O ADV. E pulses, one advance cycle per input to 160. Connected to be driven by 160 is a standard shift register unit 166, having four stages SR I–SR IV. The components in each stage of register 166 are connected, as indicated, in a manner identical to that of the detector with the exception that the output from the E4″ bit position is connected by a feedback loop 168 to the O1″ core of stage SR I. In practice, the register 166 always contains a single binary ONE in some bit position, the remaining bit positions each containing a binary ZERO. Thus, as 166 is driven by the advance cycle the binary ONE will be transferred along the register from O to E bit positions and eventually recirculated via winding 168. Considering the binary ONE to be in the O1″ position, inputs via lead 52 to 160 will operate to step the ONE from stage to stage sequentially energizing the O and E bit positions of each stage. Connected to the E bit positions E1″–E4″, are number of leads 180, 182, and 183 and 184, individual to a number of gates or relays 186, 188, 190 and 192. As the binary ONE is transferred along unit 166 its input to a given E bit position may be utilized to develop a trigger output on the leads 180, 182, 183 and 184, which in turn initiate gates 186, 188, 190 and 192. This operation generates a sequence of patterns impressed upon unit 20. Considering now that the trigger pulse on lead 52 is developed during ADV. E time, the unit 160 will then operate to produce an advance pulse on one of the leads 162 or 164 to shift the binary ONE within unit 166 one bit position within or between stages of the unit. Assuming that the system is being first initiated with the binary ONE in the E4″ position and the unit 160 energized by the arrival of a binary ONE in the E4′ bit position of unit 50, the first ADV. O pulse will transfer the binary ONE from E4″ to O1″. The immediately following ADV. E pulse will then transfer the binary ONE to the E1″ position producing a trigger output on lead 180 to operate gate 186 and the programming level connected to lead 160. The register 20 will then be driven by the code pattern associated with the level of lead 160 and considering the pattern to be as shown, ZERO ZERO ONE ZERO, the system will cycle through fifteen steps before producing a detect output on lead 52. This will in turn initiate an advance cycle from unit 160 to thus transfer the binary ONE in stage SR I to stage SR II, thus providing a trigger on lead 182 to operate unit 188 and the second programming level associated with lead 162. Following the next detect output, the system will then cycle from the particular step programmed to again provide a detect output signal on 52, stepping the unit 166 to provide a third programming of unit 20 from the programming level associated with lead 164. On the next detect output the binary ONE in unit 166 will be transferred into stage SR IV to thus energize the programming level associated with lead 166, thereby setting unit 20 with the code ONE ONE ONE ONE as indicated. The system will accordingly traverse six steps to produce a detect output on the sixth step which will result in the binary ONE being transferred from SR IV to SR I, and the entire series of cycles will be repeated.

The detect output on lead 52 will, in accordance with the cycling of the system, appear at distinctly timed intervals associated with the different programs fed into unit 20. As an alternative and frequently desirable use of the system, separate and distinct other outputs may be taken from unit 166 by providing trigger output leads from each O bit position, such leads being shown as 200, 202, 204 and 206, each connected to gates or relays 208, 210, 212 and 214. As unit 166 is stepped along to control the distinct cycle through a number of distinct programs, the binary ONE shifted from stage to stage will provide sequential triggers to operate the gates 208, 210, 212, 214 in the same sequence. Outputs taken from such units indicated by the leads 216 and 218 associated with gates 208, 214, respectively, may be fed to utility devices indicated as 220 and 222. Typical utility devices contemplated for use with the system are traffic control signals, suitably energized to be operated responsive to the presence or absence of signals from the units 220 and 222, or switches connected to drive equipment to perform manufacturing operations as in mass production.

FIGURE 5 shows yet a further embodiment of the invention which operates substantially identical to the system described with respect to FIGURE 4 with the added capability of being manually programmable in each level in terms of units of time or count expressed numerically and implemented in appropriate binary coded patterns. The additional circuit is useful in and of itself with numerous devices wherein a direct decimal to binary pattern connector encoder is needed.

Considering the system of FIGURE 5 to be essentially as shown in FIGURE 4, with respect to units 10, 14, 20, 40, 50, 160 and 166, there is included additionally a series of program levels arranged to supply leads 240, 242, 246 and 248, adapted to input to the O bit position of unit 20. In the circuit of FIGURE 5 the programming levels are defined by sources of ONE, ZERO binary intelligence which may be gates such as 249, separately supplied by a source of ONE or ZERO supplied by a lead such as 250 and 251, shown with respect to the uppermost programming level in FIGURE 5. The various gates utilized to form the programming levels and the system of FIGURE 5 are substantially identical in function as those heretofore described with respect to unit 104 in FIGURE 3, with the exception of the trigger supply energizing such gates.

In the embodiment of FIGURE 5, trigger inputs to the programming levels are supplied from gates 186, 188, 190 and 192, via a circuit device manually operated to select distinct program levels. An exemplary embodiment of this device is a co-ordinate matrix comprised of units 260 and 270, which may be considered as standard pinboards having columns and rows of spaced conductive buses which may be selectively commoned at a given coordinate by the insertion of a conductive pin at the intersection of a given column and row. The unit member 260 serves as a units matrix and the member 270 serves as a tens matrix, it being understood that in an expanded system having hundreds of stages, an additional hundreds member may be provided to permit the selection of any number between one and several hundred through the insertion of but three pins. In each of the members 260 and 270, the horizontal buses are continuous across the body of the member as indicated by the top and bottom buses 262, 264 and 272, and 274, respectively. The vertical buses of each member are also continuous across each respective member as indicated by the outside buses 266, 268, and 276, 278, for the members 260 and 270, respectively. As is typical with a co-ordinate matrix selection scheme, the horizontal and vertical buses are spaced apart out of contact from each other and arranged such that the insertion of a conductive pin in contact with a given horizontal and vertical bus will form a connection therebetween. Each horizontal level of the member 270 is physically connected to one of the output leads 160, 162, 164 and 166, from the gates 186, 188, 190 and 192, to be supplied by a pulse upon operation of the gate by reason of a trigger supplied thereto from unit 166. Each of the horizontal bus members of 260 is separately connected as a return path to an associated gate in a manner indicated by leads 280 and 282 with respect to gates 186 and 188. The vertical buses of the unit 260 are connected as inputs to a distinct program level by means of leads such as 284 shown with respect to the vertical bus associated with the decimal 1 of member 260. The vertical buses of member 270 are connected as return paths for a distinct program level by means of leads joining the vertical buses of 260, examples being shown by leads 286 and 288 with respect to the vertical buses 276 and 278. The conductive paths such as 284, 286 serve as triggering paths to the programming levels.

From the above it can be seen that each horizontal bus of the members 260 and 270 is associated with a given programming level, there being if desired, a given set of four gates for each vertical bus of the units to provide a total of fifteen possible patterns for the four stage system shown.

Following a simple operational procedure through, with pins inserted at the co-ordinate points shown in FIGURE 5, the first output from gate 186 will provide a signal through the pin shown as 300, vertical bus 278, output lead 288, the program level associated with lead 302, return lead 304, pin 306 inserted in member 260, horizontal bus 262, lead 280 and return to 186. The trigger pulse will not be impressed upon other leads connected to lead 288, since there is no available path for completion of the circuit. This operation will result in the generation of the code pattern associated with the gates connected to lead 302, as shown, ONE ZERO ZERO ZERO. This will then result in a detect output pulse being produced on the second step of the system following four (assuming two clocks per advance cycle) clock input pulses. The detect output signal then produced, as above described, will next step the unit 166 to produce a trigger through gate 188, the pin 310 connected thereto, lead 288, lead 312, lead 284, the pin 314 in unit 260, the horizontal bus connected with lead 282 and return to unit 188 to thus program the unit 20 with the pattern ZERO ZERO ONE ZERO and provide a detect output fifteen steps later. This will step unit 166 to energize 190 for a further programming step producing the pattern ONE ZERO ONE ONE, and a detect output eleven steps later. This will step unit 166 to energize 192 and provide yet a further distinct output from a pattern controlled by the insertion of pins shown in the associated levels of 260 and 270 to produce the pattern ONE ONE ONE ONE, with a detect output six steps later.

In the above example the insertion of the pins in co-ordinates in accordance with decimal value (10 and 5 for 15 in bus 262) directly encodes a binary pattern unique in the system cycle to ONE ZERO ZERO ZERO, fifteen steps away from a detect output. Considering the use of a one cycle per second clock with one advance cycle per clock input, a detect output signal will be produced at the end of fifteen seconds. The insertion of pins 310 and 314 will result in a detect signal output in eleven steps or seconds, the pins being placed respectively in the tens 0 position and in the units 6 position.

In this manner any one of the possible codes for the unit 20 may be preselected through members 260 and 270 in decimal terms associated with a given time base.

In the above embodiments of the invention the various components represented by blocks are considered to be so standard as to not require a particularized definition other than setting forth the function of the component and the input and output signal or pulse requirements. On the other hand, to avoid an unnecessary limitation on the scope of the invention, it should be clear that the characteristics of the types of components utilized may very well permit simplifications of the circuits with respect to techniques of accomplishing a desired function directly without the need for one or more of the gates, relays or other similar units respresentatively above treated. To point this out a particular magnetic core version of the circuits of the invention, being the preferred embodiment with respect to considerations of both reliability and cost of production, will be more clearly set forth by way of reference to known disclosures and FIGURE 6. Turning now to FIGURE 1, the unit 20 may be considered as substantially similar to the core circuit shown in the Sweeney patent above mentioned. The basic difference between unit 20 and that shown in the Sweeney patent involves the addition in the invention circuit of a feedback coupling winding to the last or E4 core linking the first or O1 core of the unit, and the addition of the EXCLUSIVE–OR function by reason of leads from the O3 and O4 cores to the E4 core of unit 20. This may be accomplished directly by utilizing the teaching of U.S. patent application, Serial Number 239,633 filed November 23, 1962, in the name of D. C. Englebart, et al. Relative to that disclosure and to the general EXCLUSIVE–OR function, cores O3 and O4 would represent the X and Y inputs and core E4 would represent the Z output. As explained in the Englebart application, it is necessary to omit the holding turns from the EXCLUSIVE–OR core output aperture.

In the magnetic core embodiment of the system, the unit 50 may be substantially identical to the shift register shown in the Sweeney patent, with the addition of separate input windings to each of the O cores from the leads such as 42 shown in FIGURE 1. These input windings may be accomplished without the need for any gate such as 43, by providing a single wire serially fed through each O core with a number of turns about such core in a sense to, upon energization, drive the core into the clear or set state of remanence, thereby setting a bit pattern into the register.

This is clearly shown in FIGURE 6, wherein each of the O bit positions of unit 20 are represented by standard multi-aperture cores 350 wound in four patterns of wiring to provide the particular input patterns discussed relative to FIGURE 5. The advance, prime, and coupling windings and other parts of the system have been left out for clarity. Inputs to each matrix 260 and 270, and outputs therefore are the same as in FIGURE 5. In the magnetic core embodiment the various gates 249 and gate supplies 250, 251 and various windings from gates to bit positions 240–246, may be replaced by simple conductive wires such as 360, 362, 364, 366, appropriately threading the cores in senses to drive the magnetic material thereof into distinct orientation of saturation to define binary intelligence. Trigger pulses supplied from a given gate 186–192 through the path selected by pins in units 260 and 270 develop magnetomotive forces through turns N (down or up) through each core to drive the core linked thereby to either a ONE or ZERO stable state. The turns N, shown in FIGURE 6 as single loops, can of course be increased to adjust the applied MMF to a sufficient level in order to assure that the various cores will be cleared or set as desired. With respect to greater bit lengths wherein fifty, one hundred or more O cores are linked and driven by the same conductive lead, it may be necessary to add amplification to the clear-set pulse supplied from gates 186–192. This may be done directly by each gate or otherwise in the leads 240–246 from members 260 and 270.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. In a system for producing a timed output, the combination comprising a source of clock pulses, a maximal feedback shift register for generating cycles of binary codes with each code being comprised of a series of distinct binary code patterns of equal bit length and with each pattern generated responsive to a pulse from said source, a counter detector comprised of a number of bistable stages driven by said source, said counter detector including an output lead energized by the presence of a binary one in the last stage thereof, a clear reset driver connected to said maximal feedback shift register and driven thereby to prevent the presence of a binary one in the last stage of said counter detector responsive to each binary one supplied to said counter detector from said maximal feedback shift register, whereby the code patterns generated by said maximal feedback shift register drive said counter detector to produce a detect output signal once per code cycle.

2. The system of claim 1 including a programming circuit connected to said maximal feedback shift register and including one or more sources of said distinct binary code patterns, means to operate said programming circuit to input one of said patterns from said sources into said maximal feedback shift register whereby to start said system at a point in said cycle to control the length of time between detect output pulses.

3. The system of claim 2 wherein said programming circuit includes a connection to the output from said counter detector operable to energize a selected said one of said sources to input one of said plurality of patterns into said maximal feedback shift register.

4. In a system for producing an output signal at a selected time or count with respect to a train of input pulses the combination comprising a clock source of input pulses and an advance pulse driver driven thereby, a shift register of $n$-stages capable of producing in a sequential manner, $2^n-1$ distinct one, zero binary codes of equal bit length in the stages of said register, with each distinct code related to an input pulse, the said advance driver linking said register to develop said binary code through a series of $2^n-1$ steps forming a system cycle, a counter detector including $n$-stages driven by said driver to advance a single binary state from stage to stage, the said counter detector including a detect output lead energized by the transfer of a binary one form the $n$th stage thereof, means linking the said shift register to said counter detector and operable to set binary patterns into said detector effectively blocking the transfer of a binary one from the $n$th stage except for one of said $2^n-1$ codes, whereby the distinct binary codes of said shift register serve to produce a code pattern in said counter detector developing a detect output pulse responsive to only one to the $2^n-1$ steps.

5. The system of claim 4 further including a programming circuit linked to said shift register with an input associated with the $n$-stages capable of setting one or zero binary intelligence therein to controllably program a pattern representative of one of said distinct binary codes with said shift register being initiated at a selected one of said steps to drive said counter detector to produce an output pulse at a predetermined time or count fractionally related to said system cycle.

6. The system of claim 5 further including a lead from said counter detector and a selector means driven by pulses on said lead, the said programming circuit including storage means to store distinct binary codes with said storage means being connected to said shift register and operated by pulses on said lead to said selector means to set different binary code patterns into said shift register whereby the detect output may be altered in time or count to different values depending upon operation of said selector means.

7. The system of claim 6 wherein said selector means is comprised of a further shift register driven by said detect output pulses on said lead to progressively drive said storage means through a series of steps to effect an output of said different binary code patterns stored in said programming circuit to thus drive said first mentioned shift register through a series of different system cycles to produce differently timed detect output signal pulses.

8. The system of claim 7 further including a coordinate matrix having horizontal and vertical bus members connected to said programming circuit and to said counter detector with each vertical bus member of said coordinate matrix associated with a distinct program code and each horizontal bus member driven by the output from different stages of the said further shift register whereby closure of a coordinate point of said matrix will effectively select a distinct program code pattern.

9. In a system for developing time controlled outputs, a maximal feedback shift register capable of producing a distinct series of binary codes of equal bit length with each series forming a code cycle, a counter detector driven by said shift register to develop a series of binary codes producing a single detect output signal per cycle, a clock source of pulses driving said maximal feedback shift register and said counter detector in a sequence of steps through repetitive cycles, a binary code input programming circuit linking said shift register to develop therein any one of said distinct binary codes and including a supply for initiating each code comprised of a first lead forming an input to said programming circuit and a second lead forming a return path for each of said plurality of codes in said code input programming circuit, a further shift register driven by said counter detector to produce outputs in a sequence to a plurality of horizontal bus members of a first coordinate connector having vertical bus members spaced therefrom, each associated with said first lead for each said code, a further coordinate connector having horizontal bus members forming a return path for the outputs supplied to said first connector and vertical bus members each linked with a second lead from said code input programming circuit, the selection of a given input code being accomplished by the commoning of selected intersecting horizontal and vertical bus members in each of said coordinate connectors.

References Cited by the Examiner

UNITED STATES PATENTS

| | | | |
|---|---|---|---|
| 319,782 | 6/1885 | Carr | 340—147 |
| 2,864,557 | 12/1958 | Hobbs | 340—348 |
| 3,024,455 | 3/1962 | Herrmann | 340—348 |

NEIL C. READ, *Primary Examiner.*

THOMAS B. HABECKER, *Examiner.*